US009927935B2

(12) United States Patent
Song et al.

(10) Patent No.: US 9,927,935 B2
(45) Date of Patent: Mar. 27, 2018

(54) TOUCH PANEL AND DISPLAY DEVICE

(71) Applicant: Infovision Optoelectronics (Kunshan) Co., Ltd., Kunshan, Jiangsu Province (CN)

(72) Inventors: Binbin Song, Kunshan (CN); Fengching Chiu, Taoyuan (TW); Pengfei Wang, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 15/099,544

(22) Filed: Apr. 14, 2016

(65) Prior Publication Data
US 2016/0313827 A1   Oct. 27, 2016

(30) Foreign Application Priority Data
Apr. 24, 2015   (CN) .......................... 2015 1 0201766

(51) Int. Cl.
*G06F 3/041* (2006.01)
*G06F 3/044* (2006.01)
*G02F 1/1333* (2006.01)
*G02F 1/1343* (2006.01)

(52) U.S. Cl.
CPC .......... *G06F 3/044* (2013.01); *G02F 1/13338* (2013.01); *G02F 1/134309* (2013.01); *G06F 3/0412* (2013.01); *G06F 2203/04103* (2013.01); *G06F 2203/04112* (2013.01)

(58) Field of Classification Search
CPC .......... G06F 3/044; G06F 3/041; G06F 3/045; G01R 27/26; G09G 3/36
See application file for complete search history.

(56) References Cited

U.S. PATENT DOCUMENTS

2014/0016045 A1* 1/2014 Kuo .................... G02F 1/13338
349/12
2014/0071358 A1* 3/2014 Kuriki .................... G06F 3/041
349/12

(Continued)

FOREIGN PATENT DOCUMENTS

CN   102176099 A   9/2011
CN   103105990 A   5/2013

(Continued)

*Primary Examiner* — Pegeman Karimi
(74) *Attorney, Agent, or Firm* — Cheng-Ju Chiang

(57) ABSTRACT

A touch panel includes a transparent substrate and a sensing pattern formed on the transparent substrate. The sensing pattern is in the form of a mesh structure. The mesh structure includes a plurality of conductive wires intersecting with each other to form a plurality of grids and a plurality of nodes connected between the grids. The grids are formed by the conductive wires intersecting with each other, and the nodes are formed at the intersection points of the conductive wires. The node has an annular shape with a center hole being defined in a center portion of the node. Due to the nodes having an annular shape, the surface resistance at the nodes is decreased and the signal attenuation is accordingly reduced. The conductive wires are connected firmly without the risk of breakage after the sensing pattern is formed.

15 Claims, 10 Drawing Sheets

(56) References Cited

U.S. PATENT DOCUMENTS

| | | | | |
|---|---|---|---|---|
| 2014/0216803 A1* | 8/2014 | Cheng | ............... | G06F 3/044 174/268 |
| 2014/0333851 A1* | 11/2014 | Wu | ............... | G06F 3/044 349/12 |
| 2015/0009420 A1* | 1/2015 | Zhou | ............... | H05K 3/107 349/12 |
| 2015/0042612 A1* | 2/2015 | Lee | ............... | G02F 1/13338 345/174 |
| 2016/0109977 A1* | 4/2016 | Hashimoto | ............... | G06F 3/044 345/174 |

FOREIGN PATENT DOCUMENTS

| CN | 203070265 U | 7/2013 |
|---|---|---|
| CN | 203573282 U | 4/2014 |
| CN | 203721216 U | 7/2014 |
| CN | 203773525 U | 8/2014 |
| CN | 203849707 U | 9/2014 |
| CN | 104182101 A | 12/2014 |
| CN | 204044792 U | 12/2014 |

* cited by examiner

TOUCH PANEL AND DISPLAY DEVICE

CROSS-REFERENCE TO RELATED APPLICATION

The present application is based on and claims priority of Chinese patent application No. 201510201766.0, filed on Apr. 24, 2015. The entire disclosure of the above-identified application is hereby incorporated by reference herein and made a part of this specification.

TECHNICAL FIELD

The present disclosure relates to display devices, and more particularly to a touch panel and a display device employing the touch panel.

BACKGROUND

Conventionally, touch panel is mainly used in mobile phones, tablet PCs and some other electronic devices having small-size screens. In recent years, all-in-one PCs, notebook computers and some other electronic devices having large-size screens are also provided with the touch panel. With the increase of screen size, the amount of data to be processed during operation of the touch panel is correspondingly increased. As a result, large-size touch panels should satisfy higher requirements regarding the resistance of the sensing pattern formed on the touch panel, wherein the sensing pattern typically includes a plurality of electrodes and a plurality of lead lines connected with the electrodes. When the touch panel is larger than 14 inches, the existing transparent conductive materials for the electrodes such as ITO (indium tin oxide) are no longer suitable for the large-size touch panel since a resistance value of ITO is relatively large. Thus, the touch panel of new generation is proposed to adopt a mesh structure as the sensing pattern.

FIG. 1 schematically and partially shows the sensing pattern of a touch panel according to the related art. Referring to FIG. 1, taking the sensing pattern being formed in a single layer on the touch panel as an example, the sensing pattern 10 of the touch panel includes sensing electrodes 11, driving electrodes 12, and lead lines 13. The sensing electrodes 11 and the driving electrodes 12 are generally E-shaped and mutually inserted with each other to thereby form the sensing pattern 10. The sensing electrodes 11, the driving electrodes 12 and the lead lines 13 are each formed in a mesh structure 14. That is, the sensing electrodes 11, the driving electrodes 12 and the lead lines 13 are each in the form of mesh structure.

The touch panel has an active region R1 and a peripheral region R2 on at least one side of the active region R1, wherein the electrodes 11, 12 are located in the active region R1 and the lead lines 13 are located in the peripheral region R2. The electrodes 11, 12 serve to generate a signal when the touch panel is touched by a user, so that the touched coordinates can be recognized by a touch controller (not shown). The signal generated from the electrodes 11, 12 is transmitted to the touch controller through the lead lines 13. The lead lines 13 are electrically connected to the electrodes 11, 12 and serve to transmit the signal generated from the electrodes 11, 12 to the touch controller. As for each lead line 13, one end thereof may be connected to at least one of the electrodes 11, 12, and the other end thereof may be electrically connected to a flexible printed circuit board (FPCB) which may be thereafter electrically connected to the touch controller.

The mesh structure 14 includes a plurality of conductive wires 141 intersecting with each other to form a plurality of grids 142 and a plurality of nodes 143 connected between the grids 142. The grids 142 are formed by the conductive wires 141 intersecting with each other, and the nodes 143 are formed at the intersection points of the conductive wires 141. The shape of the grids 142 may be rhombus.

FIG. 2 is an enlarged schematic view showing a portion of the mesh structure 14 of the sensing pattern 10 of FIG. 1. Referring to FIG. 2, since the node 143 is formed at the intersection point of two conductive wires 141, the surface resistance at the node 143 will be larger than the surface resistance of each conductive wire 141, leading to signal attenuation caused by the surface resistance being mainly generated at the nodes 143 as the signal is transmitted by the electrodes 11, 12 and the lead lines 13. The surface resistance at the nodes 143 is relatively large, thus affecting transmission of the signal. Also, the nodes 143 restrict the line width design of the mesh structure. The line width of the conductive wires 141 of the mesh structure cannot be designed too small.

SUMMARY

The present disclosure accordingly provides a touch panel and a display device employing the touch panel, to solve the problems that the surface resistance at the nodes of the mesh structure of the sensing pattern is relatively large and the line width of the mesh structure cannot be designed to a lower level.

In one aspect, the present disclosure provides a touch panel. The touch panel includes a transparent substrate and a sensing pattern formed on the transparent substrate. The sensing pattern is in the form of a mesh structure. The mesh structure includes a plurality of conductive wires intersecting with each other to form a plurality of grids and a plurality of nodes connected between the grids. The grids are formed by the conductive wires intersecting with each other, and the nodes are formed at the intersection points of the conductive wires. The node has an annular shape with a center hole being defined in a center portion of the node.

In another aspect, the present disclosure provides a display device. The display device includes a display panel and a touch panel integrated with the display panel. The touch panel includes a transparent substrate and a sensing pattern formed on the transparent substrate. The sensing pattern is in the form of a mesh structure. The mesh structure includes a plurality of conductive wires intersecting with each other to form a plurality of grids and a plurality of nodes connected between the grids. The grids are formed by the conductive wires intersecting with each other, and the nodes are formed at the intersection points of the conductive wires. The node has an annular shape with a center hole being defined in a center portion of the node. The display panel may be a liquid crystal display panel, an OLED display panel, etc.

Since the node has an annular shape with a center hole being defined in the center portion of the annular node, the surface resistance at the nodes can be almost the same as the surface resistance in the conductive wires. The surface resistance at the nodes of the mesh structure is decreased. A level of signal attenuation is accordingly reduced when the signal is transmitted through the mesh structure. The touch panel incorporated with the mesh structure of the sensing pattern will have a higher touch sensitivity and a faster response speed, to thereby improve the user experience.

In manufacturing the sensing pattern on a touch panel, a process such as an etching process, a printing process or a photolithography process may be used to firstly form a whole layer of the mesh structure on an entire surface of the transparent substrate, and a cutting process is then introduced to remove unnecessary portions from the whole layer of the mesh structure to thereby form sensing electrodes, driving electrodes and lead lines of the sensing pattern when the unnecessary portions of the mesh structure are removed away by the cutting process. As for the lead lines, the lead lines can be separated from each other by forming minor gaps through the nodes of the mesh structure, such that the lead lines are electrically insulated from each other. Due to the nodes having an annular shape, the conductive wires will not be disconnected after the lead lines are separated from each other by forming minor gaps through the nodes during the cutting process. Thus, the quality of the sensing pattern is improved.

In the related art, the conductive wires have to be designed with a relatively large line width in order to prevent the risk of disconnection (i.e., breakage) of the conductive wires during the cutting process. However, in the present disclosure, the risk of breakage of the conductive wires is effectively avoided because the anodes are annular-shaped. Thus, the line width of the conductive wires can be further reduced relative to the related art without the breakage risk of the conductive wires during the cutting process. Also, the center holes defined in the annular nodes allow light to be transmitted therethrough, and the mesh structure of the sensing pattern can achieve a better light transmission as the line width of the conductive wires is reduced.

Other novel features and advantages will become more apparent from the following detailed description when taken in conjunction with the accompanying drawings.

DETAILED DESCRIPTION OF PREFERRED EMBODIMENTS

Exemplary embodiments of the present disclosure are described in detail with reference to the accompanying drawings, but the present disclosure is not limited to the following embodiments.

Figure 3:
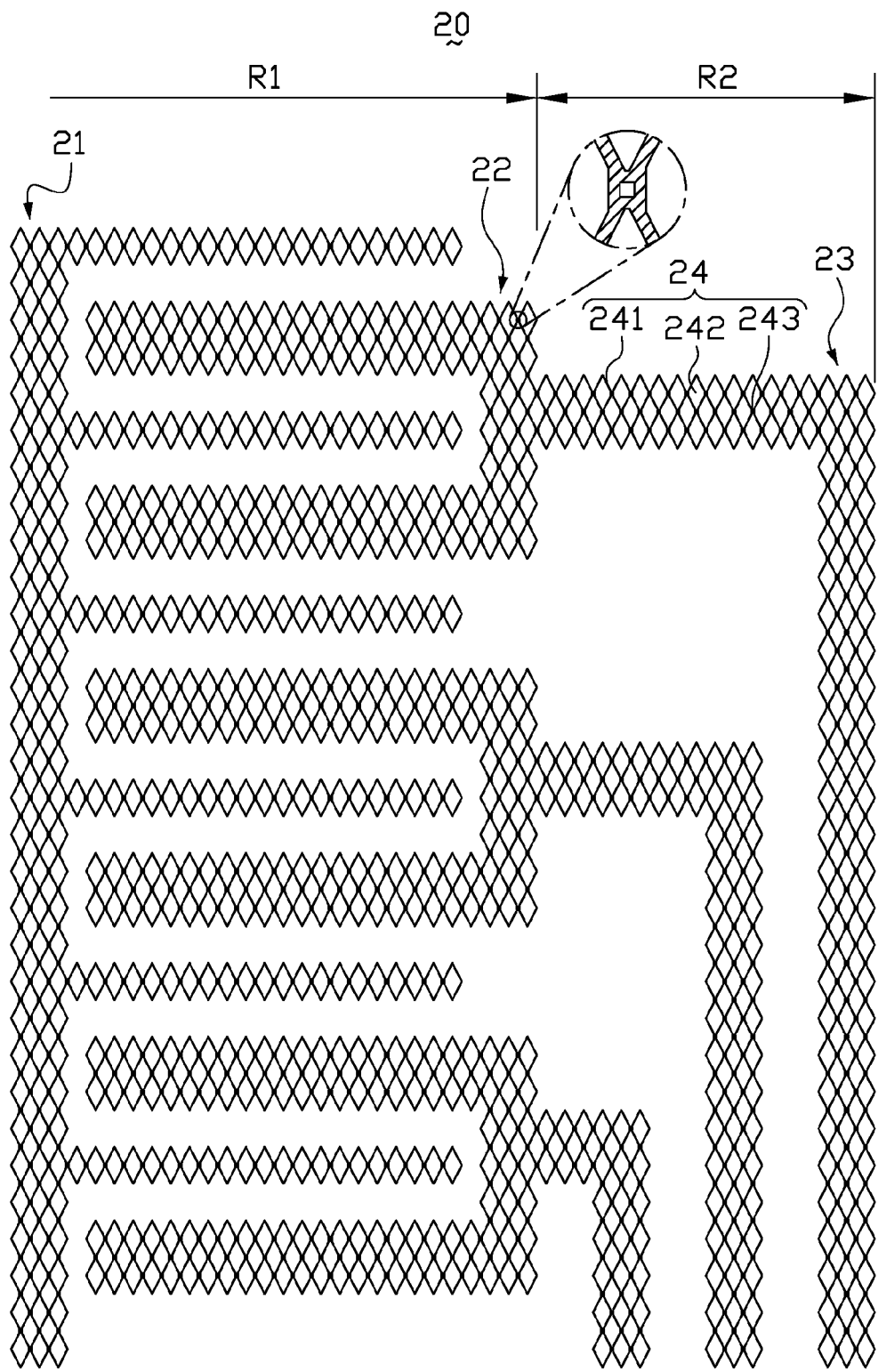
FIG. 3 schematically and partially shows the sensing pattern of a touch panel according to an embodiment of the present disclosure.

FIG. 3 schematically and partially shows the sensing pattern of a touch panel according to an embodiment of the present disclosure. Referring to FIG. 3, taking the sensing pattern 20 being formed in a single layer on the touch panel as an example, the sensing pattern 20 includes sensing electrodes 21, driving electrodes 22, and lead lines 23. The sensing electrodes 21 and the driving electrodes 22 are generally E-shaped and mutually inserted with each other to thereby form the sensing pattern 20. The sensing electrodes 21, the driving electrodes 22 and the lead lines 23 are each formed in a mesh structure 24. That is, the sensing electrodes 21, the driving electrodes 22 and the lead lines 23 are each in the form of mesh structure.

The touch panel has an active region R1 and a peripheral region R2 on at least one side of the active region R1, wherein the electrodes 21, 22 are located in the active region R1 and the lead lines 23 are located in the peripheral region R2. The electrodes 21, 22 serve to generate a signal when the touch panel is touched by a user, so that the touched coordinates can be recognized by a touch controller (not shown). The signal generated from the electrodes 21, 22 is transmitted to the touch controller through the lead lines 23. The lead lines 23 are electrically connected to the electrodes 21, 22 and serve to transmit the signal generated from the electrodes 21, 22 to the touch controller. As for each lead line 23, one end thereof may be connected to at least one of the electrodes 21, 22, and the other end thereof may be electrically connected to a flexible printed circuit board (FPCB) which may be thereafter electrically connected to the touch controller.

Figure 4:
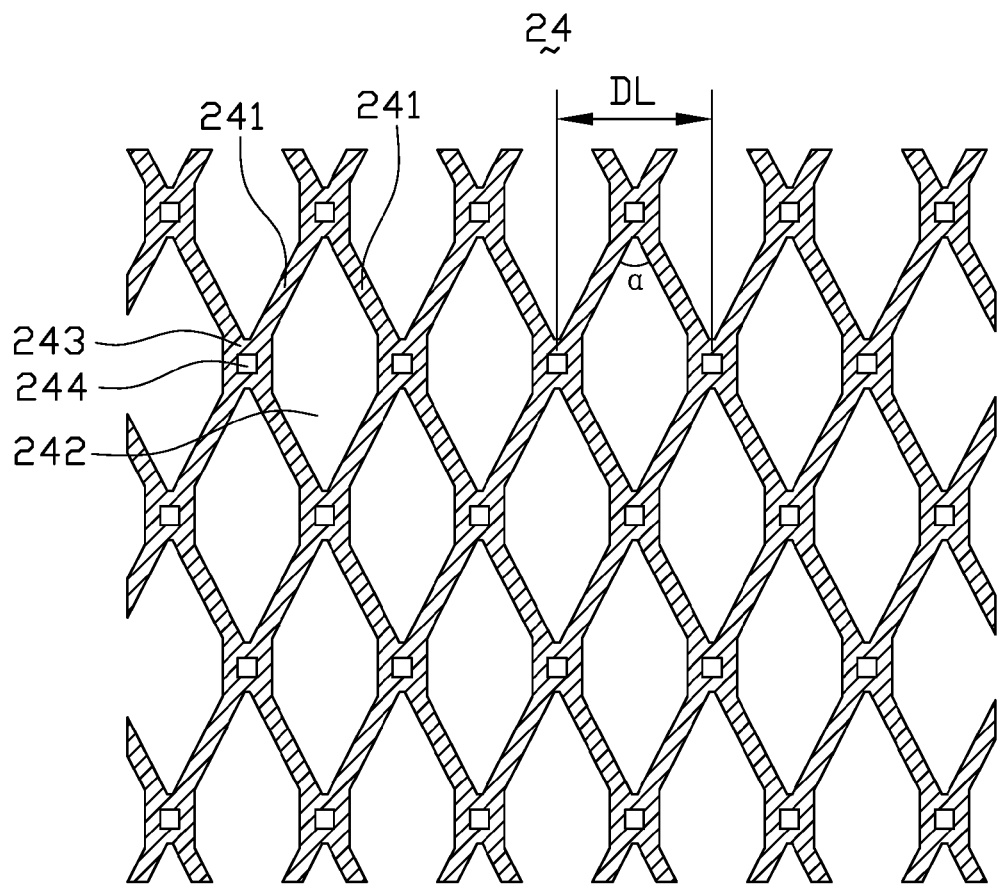
FIG. 4 schematically and partially shows the mesh structure of the sensing pattern according to a first embodiment of the present disclosure.

FIG. 4 schematically and partially shows the mesh structure of the sensing pattern according to a first embodiment of the present disclosure. Referring to FIG. 4, the mesh structure 24 includes a plurality of conductive wires 241 intersecting with each other to form a plurality of grids 242 and a plurality of nodes 243 connected between the grids 242. The grids 242 are formed by the conductive wires 241 intersecting with each other, and the nodes 243 are formed at the intersection points of the conductive wires 241. Preferably, each grid 242 has a rhomboid shape, four sides of each grid 242 are formed respectively from segments of four conductive wires 241 which are intersected with each other, and four corners of each grid 242 are connected respectively with four corresponding nodes 243. An interior acute angle α of each grid 242 is in the range from 55 degrees to 65 degrees, preferably at 58 degrees. A shorter diagonal length DL of each grid 242 is in the range from 90 um to 120 um, preferably 109 um. In the exemplary embodiment, the material of the sensing pattern 20 is metal, but not limited thereto. In other embodiments, the sensing pattern 20 may be made from transparent conductive oxide such as indium tin oxide (ITO), silver nano-wire, or graphene.

Figure 5:
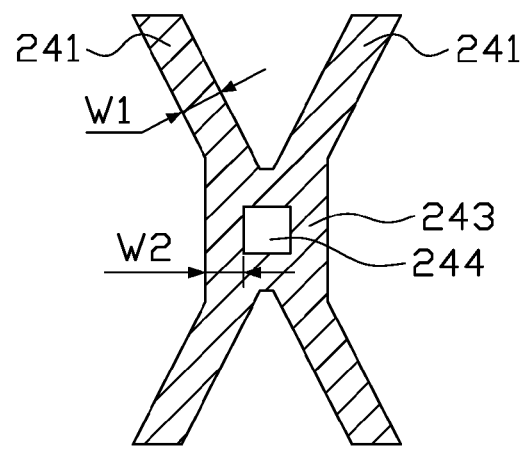
FIG. 5 is an enlarged schematic view showing a portion of the mesh structure of the sensing pattern of FIG. 4.

FIG. 5 is an enlarged schematic view showing a portion of the mesh structure of the sensing pattern of FIG. 4. As particularly shown in FIG. 5, the node 243 typically has an annular shape, with a center hole 244 being defined in a center portion of the node 243. In the exemplary embodiment, the node 243 has a square profile, that is, the outer periphery and the inner periphery of the node 243 are square-shaped, and the center hole 244 is also square-shaped. The conductive wire 241 has a line width w1, the node 243 has a line width w2, and the line width w2 of the node 243 is preferably identical to the line width w1 of the conductive wire 241.

Figure 2:
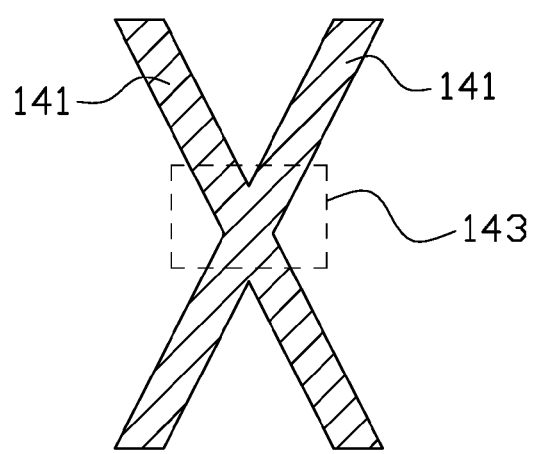
FIG. 2 is an enlarged schematic view showing a portion of the mesh structure of the sensing pattern of FIG. 1.

Due to the annular shape of the node 243, the center hole 244 defined in the center portion of the annular node 243 allows light to be transmitted therethrough. Further, since the line width w2 of the annular node 243 may be equal to the line width w1 of the conductive wire 241, the surface resistance at the node 243 can be almost the same as the surface resistance in the conductive wire 241. Compared with the node 143 shown in FIG. 2, the surface resistance at the node 243 of the present embodiment is decreased. Due to the annular node 243 having a reduced surface resistance, a level of signal attenuation is accordingly reduced when the signal is transmitted through the sensing pattern 20. The touch panel incorporated with the mesh structure 24 of the sensing pattern 20 will have a higher touch sensitivity and a faster response speed, to thereby improve the user experience.

Figure 1:
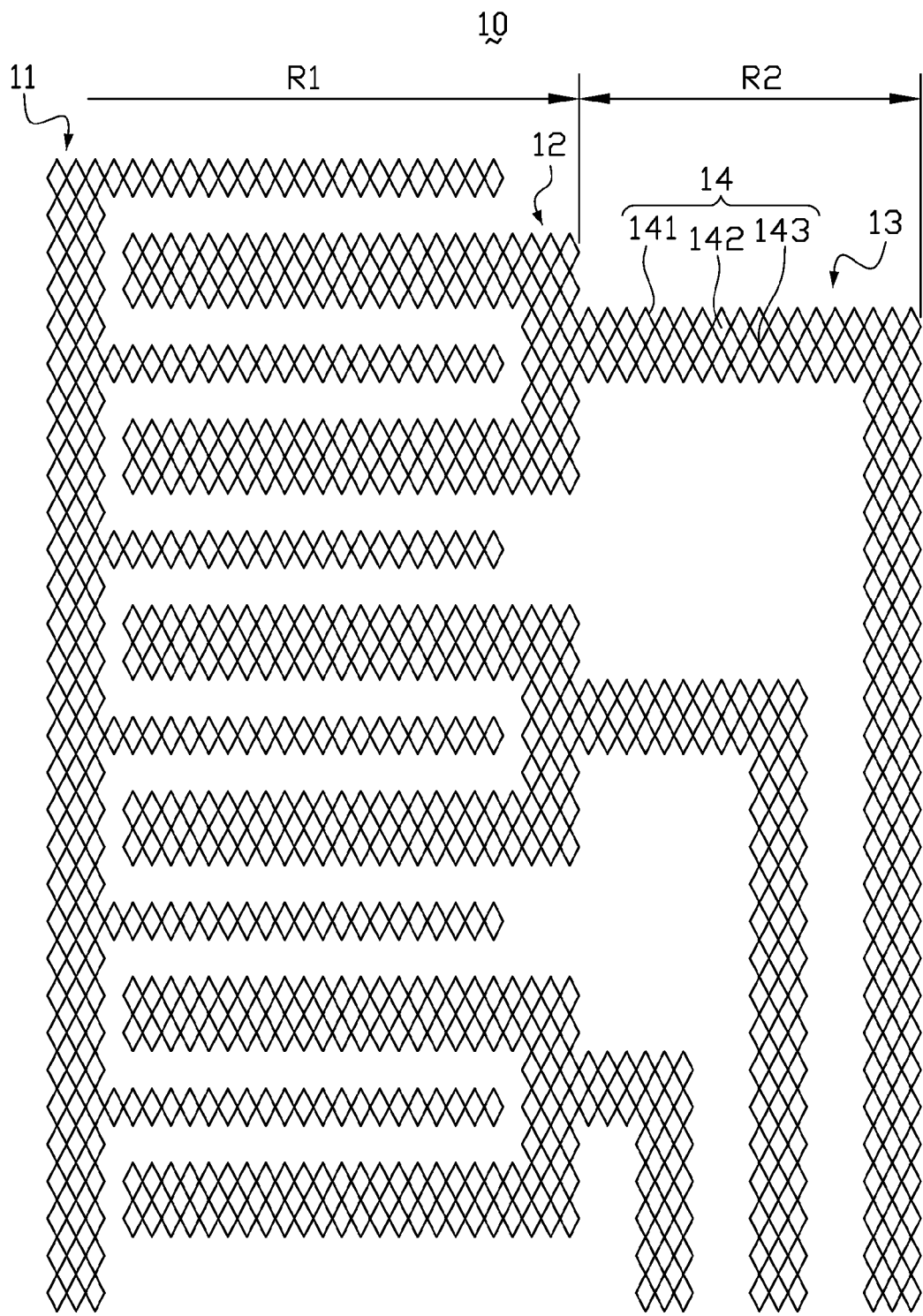
FIG. 1 schematically and partially shows the sensing pattern of a touch panel according to the related art.

In addition, the line width w1, w2 of the mesh structure 24 of the sensing pattern 20 can be reduced to thereby enable the sensing pattern 20 to have better light transmission, as compared with the sensing pattern 10 shown in FIG. 1. Experiments have show that, under the same conditions (e.g., the grid has a rhomboid shape, the interior acute angle α of each grid is at 58 degrees, the shorter diagonal length DL is 109 um, the line width w1 is 4 um, and the backlight luminance is 366.4 cd/m$^2$), a liquid crystal display device using a touch panel with the sensing pattern 20 of the present embodiment has a brightness of 340.5 cd/m$^2$ when it is displayed in white frames, and a liquid crystal display device using a touch panel with the sensing pattern 10 of the related art shown in FIG. 1 has a brightness of 315.1 cd/m$^2$ when it is displayed in white frames. That is, the touch panel having the sensing pattern 20 of the present exemplary embodiment can achieve better light transmission than the touch panel having the sensing pattern 10 of the related art shown in FIG. 1.

Figure 6A:
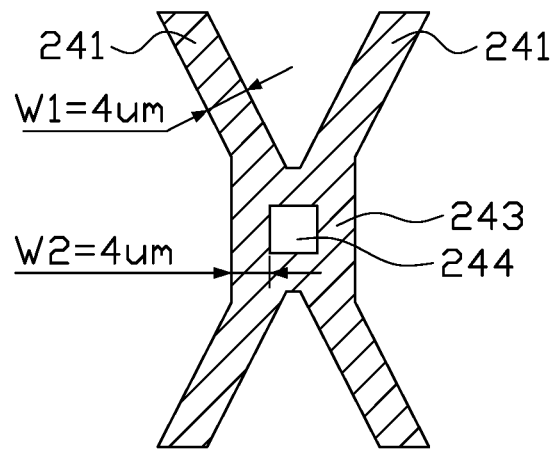
FIG. 6a and FIG. 6b are similar to FIG. 5, but showing the mesh structure of the sensing pattern with different line width.
Figure 6B:
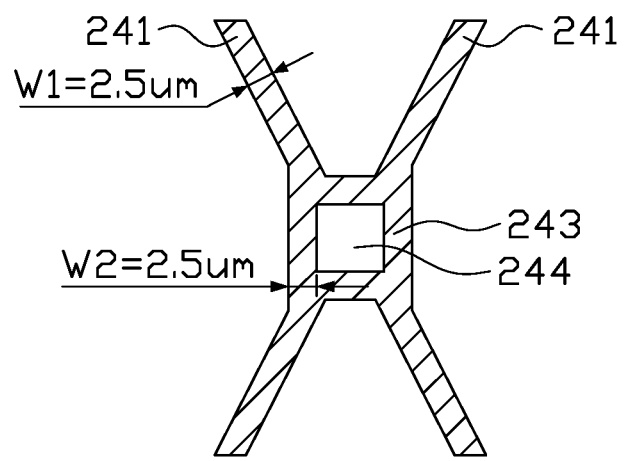

In the embodiment, the line width w1, w2 of the mesh structure 24 is less than or equal to 4 um, preferably in the range of 0.5 um~3 um. The sensing pattern 20 will have better light transmission as the line width w1, w2 of the mesh structure 24 decreases. Referring simultaneously to FIG. 6a and FIG. 6b, FIG. 6a and FIG. 6b are similar to FIG. 5, but showing the mesh structure 24 of the sensing pattern 20 with different line width w1, w2. In FIG. 6a, both of the line width w1 of the conductive wire 241 and the line width w2 of the annular node 243 are 4 um. In FIG. 6b, both of the line width w1 of the conductive wire 241 and the line width w2 of the annular node 243 are 2.5 um. As the line width w1, w2 decreases, not only a surface area defined and surrounded by each grid 242 of the mesh structure 24 increases, but also a surface area of the center hole 244 in each annular node 243 is increased. For example, assuming the surface area defined by the center hole 244 is 4 um*4 um when the line width w1, w2 is 4 um, the surface area defined by the center hole 244 will then be increased to 5.5 um*5.5 um when the line width w1, w2 is decreased from 4 um to 2.5 um. Since the surface area defined by the center hole 244 and the surface area surrounded and defined by each grid 242 are both increased as the line width w1, w2 decreases, the light-permeable area of the mesh structure 24 of the sensing pattern 20 will be greatly increased. Therefore, the mesh structure 24 of the sensing pattern 20 with smaller line width w1, w2 will allow more light to transmit through the touch panel, and a display device employing the touch panel with the mesh structure 24 of the sensing pattern 20 will accordingly have greater light transmission.

Figure 7:
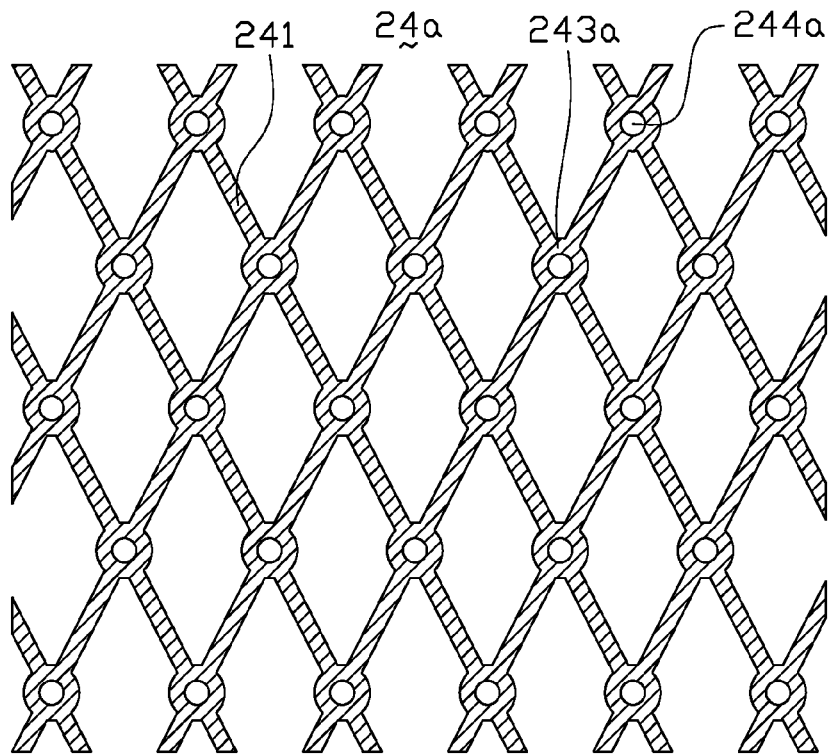
FIG. 7 schematically and partially shows the mesh structure of the sensing pattern according to a second embodiment of the present disclosure.

FIG. 7 schematically and partially shows the mesh structure of the sensing pattern according to a second embodiment of the present disclosure. As shown in FIG. 7, the sensing pattern 20a in the second embodiment formed by a plurality of conductive wires 241 intersecting with each other is similar to the sensing pattern 20 of the first embodiment as described above, the main difference lies in that the annular node 243a of the sensing pattern 20a in the second embodiment has a circular shape. That is, the outer periphery and the inner periphery of the annular node 243a are circular, and the center hole 244a defined in the center portion of the annular node 243a is a circular hole.

Figure 8:
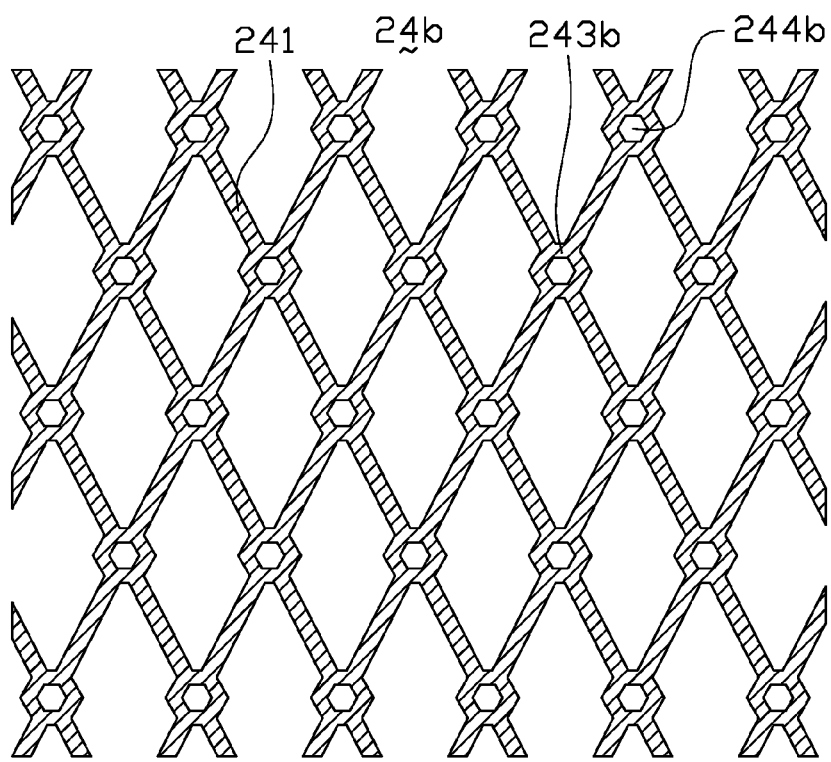
FIG. 8 schematically and partially shows the mesh structure of the sensing pattern according to a third embodiment of the present disclosure.

FIG. 8 schematically and partially shows the mesh structure of the sensing pattern according to a third embodiment of the present disclosure. As shown in FIG. 8, the sensing pattern 20b in the third embodiment formed by a plurality of conductive wires 241 intersecting with each other is similar to the sensing pattern 20 of the first embodiment as described above, the main difference lies in that the annular node 243b of the sensing pattern 20b in the third embodiment has a polygonal shape, e.g., a hexagonal shape. That is, the outer periphery and the inner periphery of the annular node 243b are polygonal, and the center hole 244b defined in the center portion of the annular node 243b is a polygonal hole.

Further, in other embodiments of the present disclosure not specifically illustrated in the figures, the annular node of the mesh structure may have other shapes, such as rectangular shape. When the annular node has a rectangular shape, the outer periphery and the inner periphery of the annular node are rectangular, and the center hole defined in the center portion of the annular node is a rectangular hole.

The touch panel having the sensing pattern 20 may be integrated with a display panel to form a display device, wherein the display panel of the display device may be a liquid crystal display panel, an organic light emitting diode (OLED) display panel, an electro-wetting display panel, an e-ink display panel, a plasma display panel or a field emission display panel.

Figure 9:
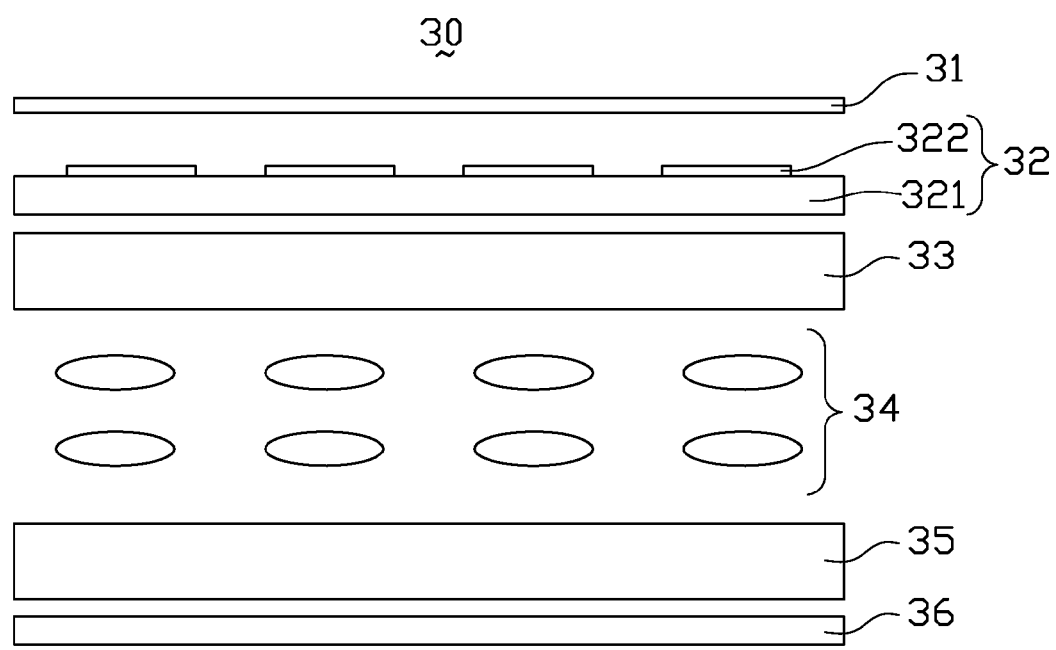
FIG. 9 schematically shows a display device employing the touch panel according to an embodiment of the present disclosure.

FIG. 9 schematically shows a display device employing the touch panel according to an embodiment of the present disclosure. Referring to FIG. 9, the display device is illustrated as being a liquid crystal display device, but not limited thereto. In the exemplary embodiment, the display device 30 includes an upper polarizer 31, a touch panel 32, a first substrate 33, a display medium layer 34, a second substrate 35, and a lower polarizer 36, with these listed components arranged in order from top to bottom. In detail, the first substrate 33 is disposed above the second substrate 35, the display medium layer 34 is disposed between the first substrate 33 and the second substrate 35, the upper polarizer 31 is disposed above the first substrate 33, the touch panel 32 is disposed between the upper polarizer 31 and the first substrate 33, and the lower polarizer 36 is disposed under the second substrate 35. Since the touch panel 32 is disposed between the upper polarizer 31 and the first substrate 33, the touch panel 32 is located near the user side in the display device. That is, the display device 30 integrated with the touch panel 32 is an on-cell type touch display device. In the display device 30 of the exemplary embodiment, the first substrate 33 may be a color filter substrate on which a color filter (not shown) is provided, the second substrate 35 may be a thin film transistor array substrate on which a thin film transistor array (not shown) is provided, and the display medium layer 34 may be a liquid crystal layer.

In the exemplary embodiment, the touch panel 32 includes a transparent substrate 321 and a sensing pattern 322 formed on a surface of the transparent substrate 321. The sensing pattern 322 formed on the transparent substrate 321 can be the sensing pattern 20 as shown in FIG. 3, and the sensing pattern 322 may be in the form of the mesh structures 24, 24a, 24b as respectively shown in FIG. 4, FIG. 7 and FIG. 8. Hereinafter, for the purpose of easy understanding and description, it is assumed that the sensing pattern 322 formed on the transparent substrate 321 has the mesh structure 24 as shown in FIG. 4.

Although the sensing pattern 322 is illustrated as being formed in a single layer on one surface of the transparent substrate 321 in FIG. 9, the touch panel 32 is not limited as such. The sensing pattern 322 can be provided on both surfaces of the transparent substrate 321 or are provided on different substrates 321. For example, the sensing electrodes 21 of the sensing pattern 20 may be formed on an upper surface of the transparent substrate 321, and the driving electrodes 22 of the sensing pattern 20 may be formed on a lower surface of the transparent substrate 321. Alternatively, the sensing electrodes 21 of the sensing pattern 20 may be formed on one transparent substrate 321, and the driving electrodes 22 of the sensing pattern 20 may be formed on another different transparent substrate 321.

In manufacturing the sensing pattern 322 on the touch panel 32, a process such as an etching process, a printing process or a photolithography process is used to firstly form a whole layer of the mesh structure 24 on an entire surface of the transparent substrate 321, a cutting process is then introduced to remove unnecessary portions from the whole layer of the mesh structure 24 to thereby form the sensing electrodes 21, the driving electrodes 22 and the lead lines 23 of the sensing pattern 20 when the unnecessary portions of the mesh structure 24 are removed away by the cutting process. After the cutting process, the sensing electrodes 21 and the driving electrodes 22 are physically separated from each other, and the lead lines 23 are also physically separated from each other, as particularly shown in FIG. 3. The gaps existed between the sensing electrodes 21 and the driving electrodes 22 can be randomly adjusted according to practical requirements during the cutting process. With respect to the gaps between the lead lines 23, the lead lines 23 can be separated from each other by forming minor gaps through the nodes 243 of the mesh structure 24, such that the lead lines 23 are electrically insulated from each other and arranged in the peripheral region R2 of the touch panel 32 in a more crowded manner by the minor gaps between the lead lines 23. Since the lead lines 23 are arranged more closely to each other in the peripheral region R2, a size of the peripheral region R2 reserved for arrangement of the lead lines 23 can be significantly reduced. Accordingly, the touch invalid area (i.e., the peripheral region R2) of the touch panel 32 is greatly reduced.

Figure 10:
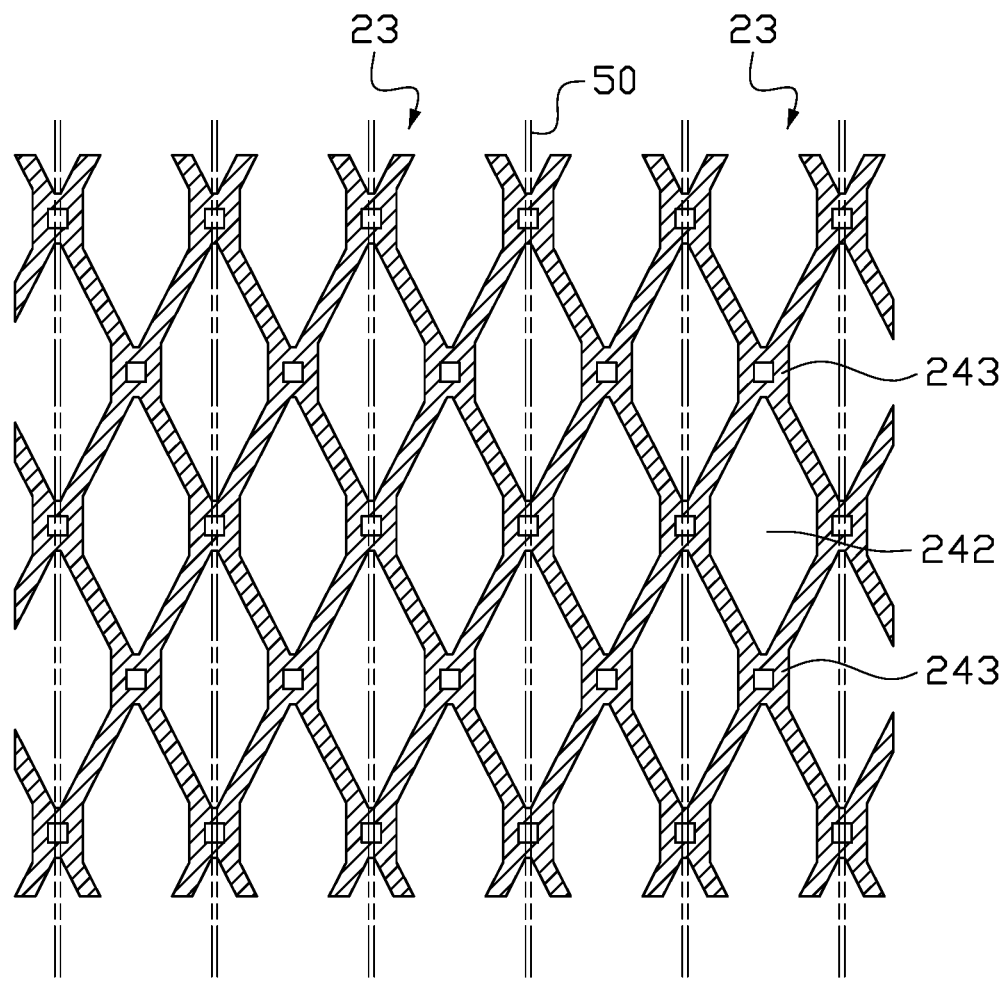
FIG. 10 schematically and partially shows the mesh structure in forming the lead lines of the sensing pattern during the cutting process.

FIG. 10 schematically and partially shows the mesh structure in forming the lead lines of the sensing pattern during the cutting process. As shown in FIG. 10, a plurality of lead lines 23 may be formed in the peripheral region R2 of the touch panel 32 by the cutting process in which the nodes 243 of the mesh structure 24 are cut and separated from each other by minor gaps to form a plurality of parallel lead lines 23. For ease of illustration, the lead lines 23 are illustrated as being cut and separated from each other by minor gaps represented by the double-dashed lines 50 in FIG. 10. After the cutting process, the lead lines 23 formed in the peripheral region R2 are electrically insulated from each other by the minor gaps defined through the nodes 243. In FIG. 10, each lead line 23 includes a plurality of grids 242 connected with each other along the extension direction of the lead line 23 by the nodes 243, with every two adjacent grids 242 being connected together by a node 243 between the two adjacent grids 242.

Figure 11:
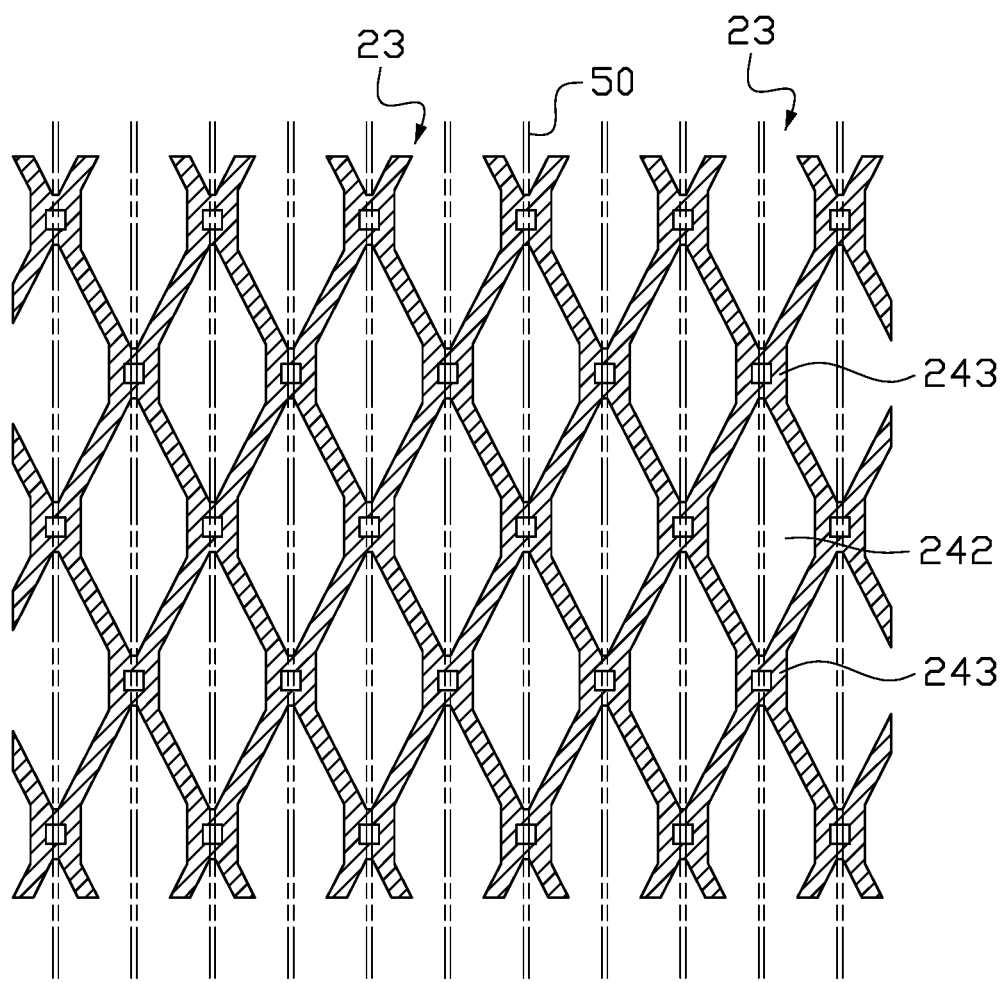
FIG. 11 is another schematic view partially showing the mesh structure in forming the lead lines of the sensing pattern during the cutting process.

FIG. 11 is another schematic view partially showing the mesh structure in forming the lead lines of the sensing pattern during the cutting process. As shown in FIG. 11, a plurality of lead lines 23 may be formed in the peripheral region R2 of the touch panel 32 by the cutting process in which the nodes 243 of the mesh structure 24 are cut and separated from each other by minor gaps to form a plurality of parallel lead lines 23. For ease of illustration, the lead lines 23 are illustrated as being cut and separated from each other by minor gaps represented by the double-dashed lines 50 in FIG. 11. After the cutting process, the lead lines 23 formed in the peripheral region R2 are electrically insulated from each other by the minor gaps defined through the nodes 243. FIG. 11 is different from FIG. 10 in that, each lead line 23 shown in FIG. 10 is further cut in half to obtain two lead lines 23 in FIG. 11. Thus, in FIG. 11, each lead line 23 includes a plurality of half portions of the grids 242 connected with each other, the half portions of the grids 242 in each lead line 23 are V-shaped and connected together by a plurality of half portions of the nodes 243, wherein every two adjacent V-shaped half portions of the grids 242 are connected together by a half portion of a node 243 between the two adjacent V-shaped half portions of the grids 242. Therefore, more lead lines 23 will be obtained if the mesh structure 24 in the peripheral region R2 of the touch panel 32 is cut and separated during the cutting process by using the cutting method shown in FIG. 11 rather than using the cutting method shown in FIG. 10. If the same number of the lead lines 23 is required to be set in the peripheral region R2, the cutting method of FIG. 11 will be more helpful in reducing the peripheral region R2 of the touch panel 32.

Figure 12:
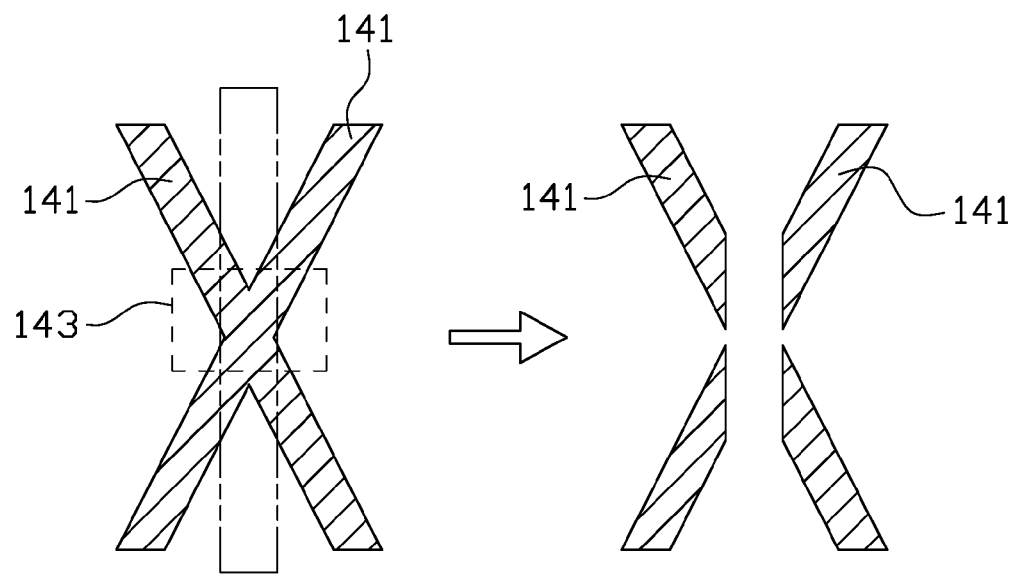
FIG. 12 schematically shows a node of the mesh structure being cut in half during the cutting process according to the related art.
Figure 13:
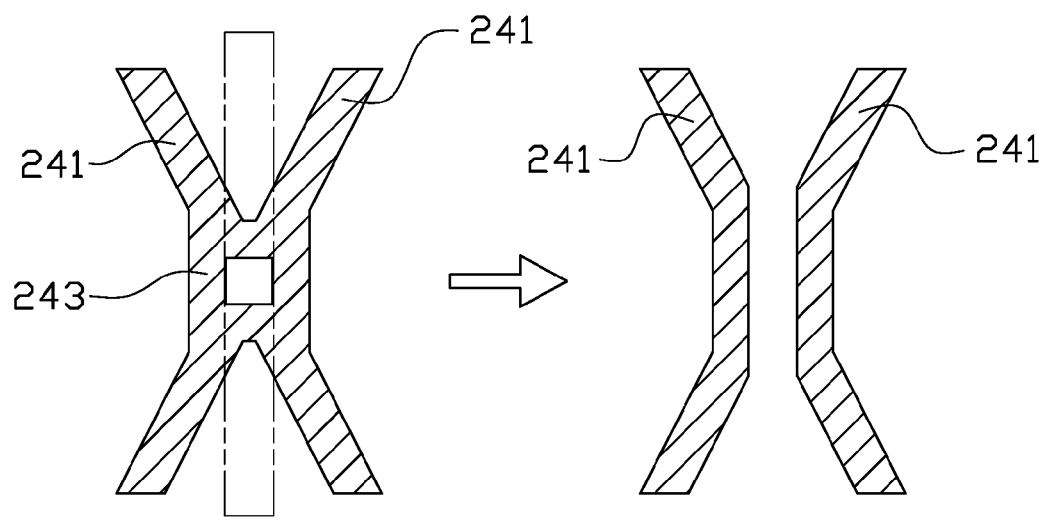
FIG. 13 schematically shows a node of the mesh structure being cut in half during the cutting process according to an embodiment of the present disclosure.

FIG. 12 schematically shows a node of the mesh structure being cut in half during the cutting process according to the related art, while FIG. 13 schematically shows a node of the mesh structure being cut in half during the cutting process according to an embodiment of the present disclosure. The node 143 in FIG. 12 and the node 243 in FIG. 13 are respectively cut and separated along a vertical direction. After the node 143 in FIG. 12 is cut and separated during the cutting process to form the sensing pattern of the touch panel, the conductive wires 141 on each side (left side or right side) of the node 143 are prone to be disconnected in the vertical direction, thereby causing disconnection to each of the conductive wires 141. However, after the node 243 in FIG. 13 is cut and separated during the cutting process to form the sensing pattern of the touch panel, the conductive wires 241 on each side (left side or right side) of the node 243 are still connected in the vertical direction. Due to the node 243 having an annular shape, each conductive wire 241 will not be disconnected in the vertical direction after the node 243 is cut and separated during the cutting process.

In FIG. 12 and FIG. 13, the nodes 143, 243 are illustrated by cutting away along the vertical direction. Due to the annular shape of the node 243, it can be easily understood that, even if the annular node 243 is cut along a horizontal direction or an inclined direction, a disconnection (i.e., breakage) phenomenon is not easily appeared in the conductive wire 241 after the cutting process. Thus, the mesh structure 24, 24a, 24b provided in the above embodiments of the present disclosure will be connected firmly and securely by the annular nodes 243, 243a, 243b, and the risk of breakage for the conductive wires 241 is avoided during the cutting process in producing the sensing pattern 20. The quality of manufacturing of the sensing pattern 20 in the touch panel 32 is therefore greatly improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch panel, comprising:
a transparent substrate; and
a sensing pattern formed on the transparent substrate, the sensing pattern being in the form of a mesh structure, the mesh structure including a plurality of conductive wires intersecting with each other to form a plurality of grids and a plurality of nodes connected between the grids, the grids being formed by the conductive wires intersecting with each other, the nodes being formed at the intersection points of the conductive wires, the node having an annular shape with a center hole being defined in a center portion of the node;
wherein the sensing pattern comprises sensing electrodes, driving electrodes, and lead lines, the sensing electrodes, the driving electrodes and the lead lines are each in the form of the mesh structure, the nodes are separated from each other by a gap defined through the nodes to form two adjacent lead lines, the gap is defined along the center holes of the nodes, the nodes are divided by the gap into two half portions which are electrically insulated from each other and connected respectively with the two adjacent lead lines;
wherein the touch panel has an active region and a peripheral region on at least one side of the active region, the sensing electrodes and the driving electrodes are located in the active region, and the lead lines are located in the peripheral region.

2. The touch panel according to claim 1, wherein the annular shape of the node is one of square shape, circular shape, polygonal shape, and rectangular shape.

3. The touch panel according to claim 1, wherein the conductive wire has a line width w1, the node has a line width w2, the line width w2 is identical to the line width w1.

4. The touch panel according to claim 3, wherein the line width w1, w2 is less than or equal to 4 um.

5. The touch panel according to claim 1, wherein each grid has a rhomboid shape, four sides of each grid are formed respectively from segments of four conductive wires intersecting with each other, four corners of each grid are connected respectively with four corresponding nodes.

6. The touch panel according to claim 5, wherein an interior acute angle of each grid is in the range from 55 degrees to 65 degrees.

7. The touch panel according to claim 5, wherein a shorter diagonal length of each grid is in the range from 90 um to 120 um.

8. The touch panel according to claim 1, wherein a material of the mesh structure is one of metal, transparent conductive oxide, silver nano-wire, and graphene.

9. A display device, comprising:
a display panel; and
a touch panel integrated with the display panel, the touch panel comprising:
a transparent substrate; and
a sensing pattern formed on the transparent substrate, the sensing pattern being in the form of a mesh structure, the mesh structure including a plurality of conductive wires intersecting with each other to form a plurality of grids and a plurality of nodes connected between the grids, the grids being formed by the conductive wires intersecting with each other, the nodes being formed at the intersection points of the conductive wires, the node having an annular shape with a center hole being defined in a center portion of the node;
wherein the sensing pattern comprises sensing electrodes, driving electrodes, and lead lines, the sensing electrodes, the driving electrodes and the lead lines are each in the form of the mesh structure, the nodes are separated from each other by a gap defined through the nodes to form two adjacent lead lines, the gap is defined along the center holes of the nodes, the nodes are divided by the gap into two half portions which are electrically insulated from each other and connected respectively with the two adjacent lead lines;
wherein the touch panel has an active region and a peripheral region on at least one side of the active region, the sensing electrodes and the driving electrodes are located in the active region, and the lead lines are located in the peripheral region.

10. The display device according to claim 9, wherein the display panel comprises:
a first substrate;
a second substrate disposed opposite to the first substrate; and
a display medium layer disposed between the first substrate and the second substrate.

11. The display device according to claim 10, wherein the display panel is a liquid crystal display panel, the first substrate is a color filter substrate, the second substrate is a thin film transistor array substrate, the display medium layer is a liquid crystal layer.

12. The display device according to claim 11, wherein the first substrate is disposed above the second substrate, the display device further comprises an upper polarizer and a lower polarizer, the upper polarizer is disposed above the first substrate, the lower polarizer is disposed under the second substrate, and the touch panel is located between the upper polarizer and the first substrate.

13. The display device according to claim 9, wherein the annular shape of the node is one of square shape, circular shape, polygonal shape, and rectangular shape.

14. The display device according to claim 9, wherein the conductive wire has a line width w1, the node has a line width w2, the line width w2 is identical to the line width w1.

15. The display device according to claim 9, wherein each grid has a rhomboid shape, four sides of each grid are formed respectively from segments of four conductive wires intersecting with each other, four corners of each grid are connected respectively with four corresponding nodes.

* * * * *